(12) United States Patent
Cusworth et al.

(10) Patent No.: US 11,005,389 B2
(45) Date of Patent: May 11, 2021

(54) POWER ELECTRONICS SYSTEM COMPRISING PARALLEL INVERTERS

(71) Applicant: Bowman Power Group Limited, Southampton (GB)

(72) Inventors: Stephen Cusworth, Southampton (GB); Stuart O'Neill, Southampton (GB); Ivan Cordero-Orille, Southampton (GB); Shinri Szymko, Southampton (GB); Paul Dowman-Tucker, Southampton (GB)

(73) Assignee: Bowman Power Group Limited, Southhampton (GB)

( * ) Notice: Subject to any disclaimer, the term of this patent is extended or adjusted under 35 U.S.C. 154(b) by 0 days.

(21) Appl. No.: 16/498,711

(22) PCT Filed: Mar. 29, 2018

(86) PCT No.: PCT/GB2018/050868
§ 371 (c)(1),
(2) Date: Sep. 27, 2019

(87) PCT Pub. No.: WO2018/178711
PCT Pub. Date: Oct. 4, 2018

(65) Prior Publication Data
US 2020/0106369 A1    Apr. 2, 2020

(30) Foreign Application Priority Data
Mar. 30, 2017 (GB) ...................... 1705092

(51) Int. Cl.
*H02M 7/00* (2006.01)
*H02M 7/493* (2007.01)
*H02J 3/46* (2006.01)
*H02P 27/06* (2006.01)

(52) U.S. Cl.
CPC ............. *H02M 7/493* (2013.01); *H02J 3/46* (2013.01); *H02P 27/06* (2013.01)

(58) Field of Classification Search
CPC .... H02M 7/493; H02J 3/46; H02J 3/38; H02J 3/0073; H02P 27/06
See application file for complete search history.

(56) References Cited

U.S. PATENT DOCUMENTS

| 5,193,054 A | 3/1993 | Galloway et al. |
| 6,274,945 B1 * | 8/2001 | Gilbreth ................. F01D 15/10 |
| | | 290/47 |
| 9,627,894 B1 * | 4/2017 | Mayer ..................... H02J 3/381 |

(Continued)

FOREIGN PATENT DOCUMENTS

| DE | 3718529 | 2/1988 |
| WO | WO2000069221 | 11/2000 |

(Continued)

*Primary Examiner* — Adolf D Berhane
*Assistant Examiner* — Afework S Demisse
(74) *Attorney, Agent, or Firm* — Blanchard & Associates

(57) ABSTRACT

A turbogenerator power electronics system for use with a turbogenerator is described, wherein the turbogenerator power electronics system comprises a plurality of power electronics subsystems connected in parallel, each power electronics subsystem comprising an inverter. In such a way, a modular, reconfigurable power electronics system with increased ability to operate during a fault is provided.

13 Claims, 1 Drawing Sheet

(56) References Cited

U.S. PATENT DOCUMENTS

2009/0218977 A1  9/2009  Pan et al.
2015/0357950 A1* 12/2015  Lyons .................. H02P 9/102
                                      290/40 B

FOREIGN PATENT DOCUMENTS

| WO | WO2001073921 | 10/2001 |
| WO | WO2001082445 | 11/2001 |
| WO | WO2010112094 | 10/2010 |

* cited by examiner

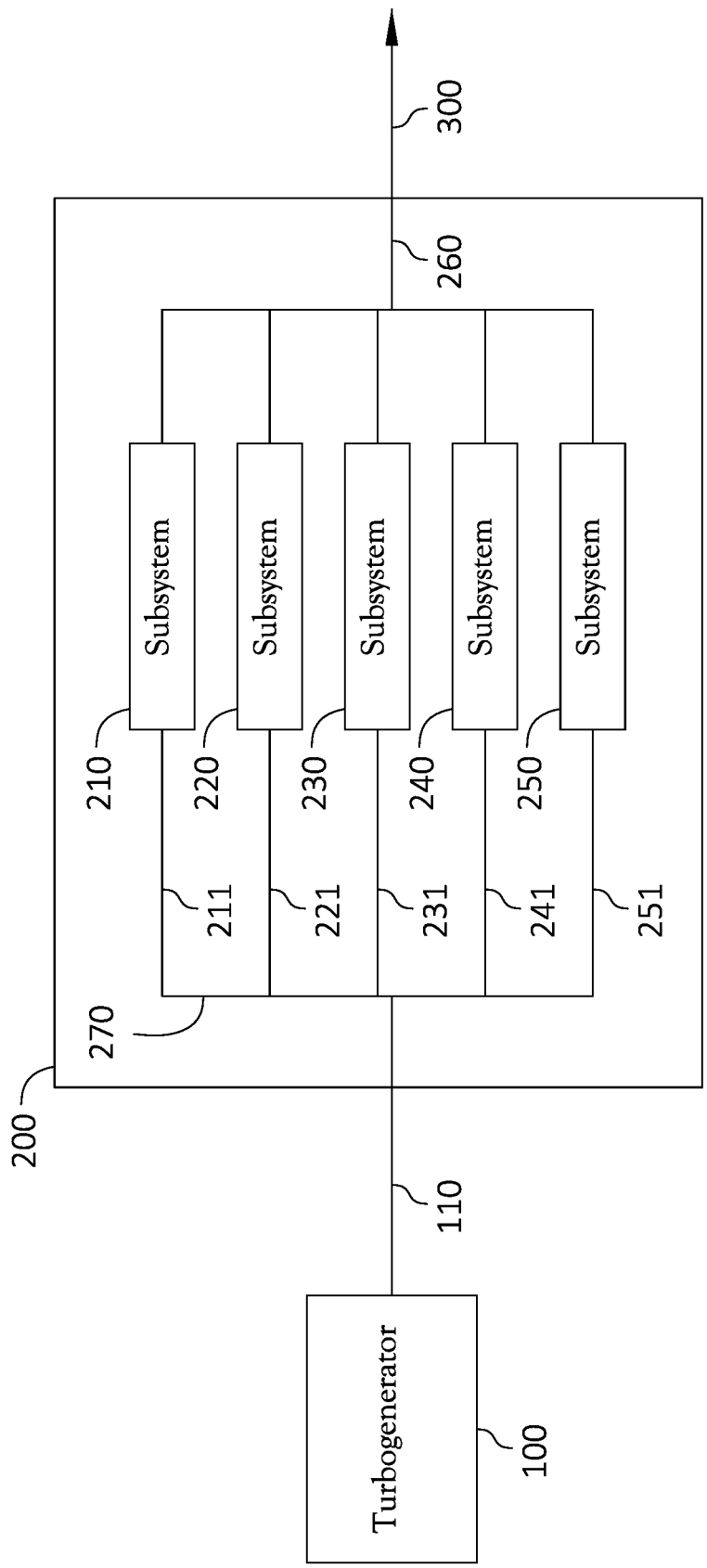

POWER ELECTRONICS SYSTEM COMPRISING PARALLEL INVERTERS

FIELD OF THE INVENTION

The present invention relates to a turbogenerator power electronics system, more specifically a turbogenerator power electronics system comprising a plurality of power electronics subsystems connected in parallel, wherein each power electronics subsystem comprises an inverter.

BACKGROUND TO THE INVENTION

In the state of the art, power electronics systems frequently include inverter systems that convert direct current (DC) to alternating current (AC). The incorporation of an inverter remains commonplace where any power electronics system operates in tandem with a turbogenerator system.

The electrical output of any turbogenerator system may lie anywhere within a wide range of values, depending on the specific size and use of the turbogenerator system in question. As such, the capacity of any inverter operating alongside a turbogenerator system must also be chosen and tailored to meet the operational requirement of the turbogenerator system.

To provide an inverter which meets the requirements of any one particular turbogenerator system, it is common to design a specific, custom inverter unit. In this way, the inverter unit will have a capacity which is precisely aligned with the output of the turbogenerator system. However, such an approach is problematic as any fault with the inverter will result in the complete shutdown of the turbogenerator unit and, therefore, the generation of electrical power. Additionally, the design and construction of a custom inverter is often relatively expensive, placing this technology out of the reach of many businesses and industries.

SUMMARY OF THE INVENTION

According to a first aspect of the present invention, there is provided a turbogenerator power electronics system for use with a turbogenerator, said turbogenerator power electronics system comprising a plurality of power electronics subsystems connected in parallel, wherein each power electronics subsystem comprises an inverter.

The connection of a plurality of power electronics subsystems in parallel is advantageous for many reasons. Firstly, the use of a plurality of power electronics subsystems allows multiple power electronics subsystems to be used in each power electronics system. The use of multiple power electronics subsystems helps to reduce the costs associated with any power electronics system, as the same 'base' power electronics subsystem may be used across many different power electronics systems, just in different numbers. Such a modular construction allows for large scale production and thus invokes economies of scale, unlike the present approach where a custom inverter is required in many applications.

Additionally, the use of multiple power electronics subsystems connected in parallel ensures that a fault with any one power electronics subsystem does not necessarily prevent the operation of the turbogenerator as a whole. If there is a fault with a single power electronics subsystem, any current directed to that power electronics subsystem from the turbogenerator may be rerouted to other power electronics subsystems in the power electronics system, allowing the turbogenerator to continue operation with minimal interruption or, alternatively, uninterrupted.

Preferably, power electronics subsystems in the plurality of power electronics subsystems are linked by a communication bus. More preferably, the communication bus is a controller area network bus (CAN bus).

Preferably, the plurality of power electronics subsystems comprises a master power electronics subsystem and at least one slave power electronics subsystem. More preferably, the plurality of power electronics subsystems is configured to select the master power electronics subsystem randomly from the plurality of power electronics subsystems at power-up. Alternatively, it may be preferable to configure the plurality of power electronics subsystems to select the master power electronics subsystem from the plurality of power electronics subsystems following a pre-configured hierarchy.

Preferably, the master power electronics subsystem and the at least one slave power electronics subsystem are configured to be in two-way communication with one another via the communication bus.

Preferably, the at least one slave power electronics subsystem is configured to check the status of the master power electronics subsystem. Preferably, the plurality of power electronics subsystems is configured to re-designate a slave power electronics subsystem as a replacement master power electronics subsystem if a fault is detected with the original master power electronics subsystem.

Preferably, the plurality of power electronics subsystems is configured such that the master power electronics subsystem designates the current (power) split provided to each slave power electronics subsystem. Preferably, the power electronics system further comprises a power control device in communication with the plurality of power electronics subsystems via the communication bus. More preferably, the power control device comprises a pneumatic or electrical regulator valve or a waste gate valve. More preferably, the power control device comprises a brake resistor. Still more preferably, the brake resistor is located with the power electronics system. Preferably, the turbogenerator power electronics system comprises a single power control device. More preferably, the turbogenerator power electronics system comprises a power control device as part of or associated with each individual power electronics subsystem.

Preferably, each power electronics subsystem included in the plurality of power electronics subsystems is electrically isolated from the other power electronics subsystems. More preferably, each power electronics subsystem included in the plurality of power electronics subsystems is electrically isolated from the other power electronics subsystems by input and output circuit breakers.

Preferably, each power electronics subsystem included in the plurality of power electronics subsystems is functionally equivalent. More preferably, each power electronics subsystem included in the plurality of power electronics subsystems is identical.

Preferably, the power electronics system is an exhaust gas turbogenerator power electronics system.

According to a second aspect of the invention, there is provided a system comprising a turbogenerator and a power electronics system as described herein, wherein the turbogenerator is electrically connected to the power electronics system.

Such a system incorporates the previously described advantages of the power electronics system.

Preferably, the system may also comprise an electrical brake or other speed control device which is configured to monitor the turbogenerator speed and activate if the turbogenerator speeds exceeds a certain level.

Preferably, the system further comprises a valve for controlling the flow of a gas through the turbogenerator. More preferably, the valve is a waste gate or regulator valve.

Preferably, the gas comprises gases from an engine or other prime mover. More preferably, the gas comprises exhaust gases form an engine or other prime mover.

DETAILED DESCRIPTION

Embodiments of the present invention will now be described by way of example only and with reference to the accompanying drawings, in which:

FIG. 1 is a schematic illustration of a turbogenerator system and a power electronics system according to the present claimed invention.

Referring to FIG. 1, there is shown a turbogenerator 100 in electrical connection with a power electronics system 200. Here the electrical connection between the turbogenerator 100 and the power electronics system 200 is provided by a first wire 110.

The power electronics system 200 itself comprises a plurality of power electronics subsystems 210, 220, 230, 240, 250, each subsystem comprising an inverter. Each of these power electronics subsystems 210, 220, 230, 240, 250 is located within the power electronics system 200. Each of the power electronics subsystems 210, 220, 230, 240, 250 is mounted in parallel to one another. The current entering the power electronics system 200 is divided into a plurality of paths such that it travels along a plurality of wires 211, 221, 231, 241, 251 and through the plurality of power electronics subsystems 210, 220, 230, 240, 250 before the plurality of paths recombine to a single path, here second wire 260. Therefore, the power electronics subsystems 210, 220, 230, 240, 250 are mounted in parallel such that each path which forms the plurality of paths passes through only a single power electronics subsystem 210, 220, 230, 240, 250.

After the plurality of paths recombine to form the second wire 260, the electrical current passing along the second wire 260 is carried out of the power electronics system 200 along a third wire 300, this third wire 300 transporting the electrical power to a desired location.

During operation of the turbogenerator 100, electrical current is supplied to the power electronics system 200. Initially, this electrical current is split such that a proportion of the current passes through each of the plurality of power electronics subsystems 210, 220, 230, 240, 250. The distribution of the incoming current to each of the plurality of power electronics subsystems 210, 220, 230, 240, 250 may be controlled by a master power electronics subsystem.

In this case, during the initial start-up phase of the power electronics system, 200, the power electronics system 200 will assign an power electronics subsystem as the master power electronics subsystem. To facilitate this, the power electronics subsystems which form the plurality of power electronics subsystems 210, 220, 230, 240, 250 are linked by an electronic communications bus, such as a controller area network bus (CANbus) 270. During the power-up phase, the power electronics subsystems 210, 220, 230, 240, 250 send negotiation messages to each other via the CANbus, and one power electronics subsystem is randomly selected as the master power electronics subsystem. The remaining power electronics subsystems are then configured as slaves. During operation, the master power electronics subsystem will also receive status update messages from each of the slave power electronics subsystems and, therefore, effectively monitors the status of each slave power electronics subsystem.

During the initial power-up phase, any of the plurality of power electronics subsystems 210, 220, 230, 240, 250 may be assigned as the master power electronics subsystem. The process of assigning the master power electronics subsystem is random. To facilitate this each of the power electronics subsystems in the plurality of power electronics subsystems 210, 220, 230, 240, 250 is functionally equivalent, and potentially identical.

During operation of the turbogenerator 100, the master power electronics subsystem continually monitors the status of each of the slave power electronics subsystems via messages or control signal passed through the CANbus. Where the turbogenerator 100 is connected to an exhaust gas flue of a prime mover, the turbogenerator 100 may further include a waste gate valve that controls the flow of exhaust gases through the turbogenerator 100. Again, this waste gate may be in communication with the master power electronics subsystem via signals passed through the CANbus.

Whilst the turbogenerator 100 is operating, the master power electronics subsystem operates an algorithm which calculates the current demand required to maintain the speed of the turbogenerator 100 within operational limits. Additionally, the master power electronics subsystem calculates how much of this current demand must be assigned to each power electronics subsystem to provide the required overall load, this information communicated to each of the slave power electronics subsystems via the CANbus.

If, during operation of the turbogenerator 100, the master power electronics subsystem detects a fault with any one of the slave power electronics subsystems, the master power electronics subsystem will control the reconfiguration of the power electronics subsystems and the turbogenerator 100. This reconfiguration is undertaken to ensure power production is maintained at the maximum possible level without damaging the turbogenerator 100 or the power electronics subsystems 210, 220, 230, 240, 250.

If the load required by the turbogenerator 100 is above that which can be safely provided by the remaining power electronics subsystems, the master power electronics subsystem will ensure any extra load is provided by other means. For example, a power control device may also be in communication with the master power electronics subsystem via the CANbus. This power control device may be a waste gate valve for controlling the passage of exhaust gases through the turbogenerator or a brake resistor located within the power electronics system 200. In any case, the failsafe power control device will allow a reduction in the amount of current the power electronics subsystems are required to export to the gird, ensuring the power electronics subsystems are not pushed beyond their operational limits after any failure. The operation of the power control device will also ensure that the load on the turbogenerator 100 is such that the speed of the turbogenerator 100 is maintained within safe limits. In systems where an electrical brake is used alongside a waste gate valve, the electrical brake acts to rapidly control the speed of the turbogenerator 100 whilst waiting for the slower valve control to activate and directly reduce the power at the turbogenerator turbine.

Following any detected fault, the slave power electronics subsystem that initiated the fault will be removed from service. This removal of the slave power electronics subsystem from service is achieved by triggering input and output circuit breakers associated with the power electronics subsystem, such that the power electronics subsystem is electrically isolated. If any fault is detected with the master power electronics subsystem, either by the master power electronics subsystem itself or by a slave power electronics subsystem, the master power electronics subsystem will electrically isolate itself and a new master power electronics subsystem will be selected via negotiation messages sent between the power electronics subsystems 210, 220, 230, 240, 250 via the CANbus. This newly elected master power electronics subsystem will then control the operation of the remaining slave power electronics subsystems, reassigning the load required by the turbogenerator 100 across the remaining power electronics subsystems 210, 220, 230, 240, 250.

In some embodiments of the invention, to return the out of service power electronics subsystem 210, 220, 230, 240, 250 to service it is necessary to stop the operation of the turbogenerator 100. In this situation, the faulty power electronics subsystem 210, 220, 230, 240, 250 is repaired or replaced, and then the circuit breakers are manually reset. Once these operations are complete, the turbogenerator 100 may be restarted and the supply of power to the power electronics subsystems 210, 220, 230, 240, 250 is resumed.

Alternatively, the power electronics subsystems 210, 220, 230, 240, 250 may be 'hot swappable'. Here, if the individual power electronics subsystems 210, 220, 230, 240, 250 are sufficiently electrically isolated from each other, any individual power electronics subsystem 210, 220, 230, 240, 250 may be replaced after a fault without ceasing operation of the turbogenerator 100. Once the faulty power electronics subsystem 210, 220, 230, 240, 250 has been replaced, the replacement power electronics subsystem 210, 220, 230, 240, 250 will communicate with the master power electronics subsystem. However, no current from the turbogenerator 100 will be sent to the replacement power electronics subsystem 210, 220, 230, 240, 250 until the miniature circuit breaker and all other isolation devices have been reset.

Once the fault condition has been cleared and the miniature circuit breakers and other isolation units reset, the master power electronics subsystem will return power from the turbogenerator 100 to the power electronics subsystems 210, 220, 230, 240, 250 by reducing and removing the influence of the power control device. For example, where the power control device is a brake resistor, current from the turbogenerator 100 will be redirected from the brake resistor to the power electronics subsystems 210, 220, 230, 240, 250 once the fault condition has been cleared. Alternatively, where the failsafe control device is a waste gate valve that controls the flow of exhaust gases through the turbogenerator 100, this valve will be closed to ensure all exhaust gases flow through the turbogenerator 100 once the fault is cleared.

The provision of a power electronics system 200 as described above is advantageous for many reasons. For example, a number of identical power electronics subsystems 210, 220, 230, 240, 250 may be used, allowing for a reduction in the cost of producing these units due to economies of scale. Additionally, if failure in any failure of a power electronics subsystem occurs, the power electronics system 200 can reallocate the power coming from the turbogenerator to ensure that the turbogenerator can continue to operate without interruption or, alternatively, that any interruption to the operation of the turbogenerator 100 is minimised. This is not possible in power electronics systems comprising a single inverter, as any failure in the inverter will result in the complete inoperability of the power electronics system.

Furthermore, such a system is advantageous as it allows for a high-power power electronics system 200 to be constructed with modular power electronics subsystems, this modular system including any desired amount of redundancy, or to run at lower power state if there is no redundancy and a failure of a power electronics subsystem occurs.

The invention claimed is:

1. A turbogenerator power electronics system, said turbogenerator power electronics system comprising a plurality of power electronics subsystems connected in parallel and linked by a communication bus, wherein each power electronics subsystem comprises an inverter, wherein said plurality of power electronics subsystems comprises a master power electronics subsystem and at least one slave power electronics subsystem, wherein said plurality of power electronics subsystems is configured to select said master power electronics subsystem randomly from said plurality of power electronics subsystems at power-up.

2. The turbogenerator power electronics system of claim 1, wherein said master power electronics subsystem and said at least one slave power electronics subsystem are configured to be in two-way communication with one another via said communication bus.

3. The turbogenerator power electronics system of claim 1, wherein said at least one slave power electronics subsystem is configured to check the status of said master power electronics subsystem.

4. The turbogenerator power electronics system of claim 1, wherein said plurality of power electronics subsystems is configured to re-designate a slave power electronics subsystem as a replacement master power electronics subsystem if a fault is detected with said master power electronics subsystem.

5. The turbogenerator power electronics system of claim 1, wherein said plurality of power electronics subsystems is configured such that said master power electronics subsystems designates the current (power) provided to each slave power electronics subsystems.

6. The turbogenerator power electronics system of claim 1, wherein said turbogenerator power electronics system further comprises a power control device in communication with said plurality of power electronics subsystems via said communication bus.

7. The turbogenerator power electronics system of claim 6, wherein said power control device comprises a pneumatic or electrical regulator valve.

8. The turbogenerator power electronics system of claim 6, wherein said power control device comprises a brake resistor.

9. The turbogenerator power electronics system a of claim 1, wherein each power electronics subsystems included in said plurality of power electronics subsystems is electrically isolated from the other power electronics subsystems.

10. The turbogenerator power electronics system a of claim 9, where each power electronics subsystem included in said plurality of power electronics subsystems is electrically isolated from the other power electronics subsystems by input and output circuit breakers.

11. The turbogenerator power electronics system of claim 1, wherein each power electronics subsystem included in said plurality of power electronics subsystems is functionally equivalent.

12. A system comprising a turbogenerator and a turbogenerator power electronics system, the turbogenerator power electronics system comprising a plurality of power electronics subsystems connected in parallel and linked by a communication bus, wherein each power electronics subsystem comprises an inverter, wherein said plurality of power electronics subsystems comprises a master power electronics subsystem and at least one slave power electronics subsystem, wherein said plurality of power electronics subsystems is configured to select said master power electronics subsystem randomly from said plurality of power electronics subsystems at power-up, wherein said turbogenerator is electrically connected to said power electronics system.

13. A turbogenerator power electronics system, said power turbogenerator power electronics system comprising a plurality of power electronics subsystems connected in parallel and linked by a communication bus, wherein each power electronics subsystem comprises an inverter, wherein said plurality of power electronics subsystems comprises a master power electronics subsystem and at least one slave power electronics subsystem, wherein said plurality of power electronics subsystems is configured to select said master power electronics subsystem from said plurality of power electronics subsystems following a pre-configured hierarchy at power-up.

* * * * *